Aug. 20, 1929.　　　R. O. PICKIN　　　1,725,298

WELL DRILLING TOOL

Filed Aug. 2, 1926

INVENTOR

R. O. Pickin

Patented Aug. 20, 1929.

1,725,298

UNITED STATES PATENT OFFICE.

ROWLAND O. PICKIN, OF LOS ANGELES, CALIFORNIA.

WELL-DRILLING TOOL.

Application filed August 2, 1926. Serial No. 126,438.

My invention relates to improvements in well-drilling tools, used for rolling out collapsed or dented casing, and like purposes.

The principal object of the invention is to provide a well-drilling tool with means whereby it can be readily converted to various uses to which it is adaptable.

Another object of the invention is to provide a well-drilling tool with bearings that impart an oscillating movement to the rollers, so as to gradually smooth out the object upon which they operate.

Another object of the invention is to provide a well-drilling tool with a roller, that exerts pressure simultaneously on diametrically opposite sides of the periphery of the roller.

Another object of the invention is to provide a well-drilling tool with a series of rollers, that exert pressure on diametrically opposite sides and allow the tool ample clearance on a line at right angles thereto.

Another object of the invention is to provide a well-drilling tool upon which a number of rollers of various gages may be assembled without unduly weakening the tool.

Other objects and advantages of the invention will be apparent as it is better understood from the following description when considered in conjunction with the accompanying drawings illustrating a preferred embodiment thereof.

On the drawings.

Similar numerals refer to similar parts throughout the several views.

Figures 1, 2:
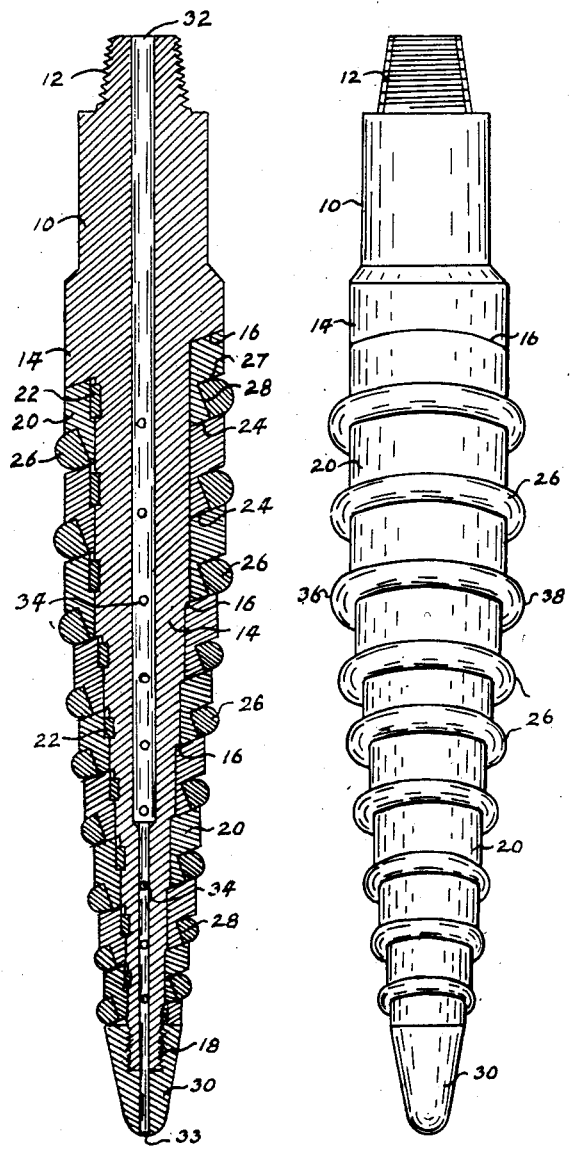
Fig. 1 is a sectional elevation of the tool, showing the rollers in the position in which there is clearance on both sides.
Fig. 2 is a quarter turned side elevation of Fig. 1, showing the rollers in the position in which they operate on diametrically opposite sides simultaneously.

In Figs. 1 and 2, the numeral 10 indicates the shank of the tool, upon which is the threaded connection 12. The shaft or mandrel 14 projects downwards from the shank 10. In Fig. 1, the shaft 14 is shown to taper or gradually reduce in diameter by a series of oblique shoulders 16, and to terminate in the threaded pin connection 18.

The concentric bearings 20 are mounted upon the shaft 14, and are prevented from turning by the keys 22. The ends 24 of the bearings are cut obliquely to the vertical center of the tool and bear against the adjacent bearings, also against the shoulders 16 of the shaft, when the shaft varies in diameter.

The roller 26 is slidingly mounted upon the oblique bearing 28 and is retained in operating position by the shoulder 27, and by the adjacent bearing. When the rollers 26 and the bearings 20 are all assembled on the shaft 14, they are retained in position by screwing the nose or cap 30 upon the pin 18.

The water channel 32 allows the flushing-out fluid or lubricant to pass down the tool and out of the tool at 33, and also into the channels 34 through the shaft 14 to lubricate the bearings 28.

Rollers or balls may be inserted as an additional anti-friction means.

In Fig. 1, it will be seen that if two lines are drawn vertical or parallel with the outer edge of the roller, the distance between them is less than two lines drawn vertical or parallel with the outer edges of the rollers shown in Fig. 2, therefore the rollers are in contact with the object upon which they operate at the diametrically opposite points only, as indicated at 36 and 38, Fig. 2. These points are continually changing or oscillating, as the shaft 14 rotates, while the roller does not rotate when in contact with an outside object, but has an upward and downward movement, caused by the tool forcing around the inclined bearing upon which the roller is mounted.

There is great force in this movement, as the whole of the roller, except the points in contact, acts as a lever to give the roller the oscillating motion.

The tool is easily converted to various uses by merely changing the outer contour of the rollers.

It is thought that the invention will be sufficiently understood from the foregoing description, and it will be apparent that various changes may be made in the form, construction, and arrangements of the various parts without departing from the spirit and scope of the invention, or sacrificing any of its material advantages, the form herein described being merely a preferred embodiment thereof.

I claim:

1. A well-drilling tool provided with a central shaft, a bearing keyed upon said shaft, and an inclined roller mounted upon said bearing, said roller being central with regards to the axis of said shaft.

2. A well-drilling tool consisting of a shank, a connection, a central shaft, inclined bearings keyed centrally upon said shaft, and inclined rollers slidingly mounted centrally upon said bearings.

3. A well-drilling tool consisting of a shank, a connection, a shaft with inclined rollers slidingly mounted upon inclined bearings, said bearings being retained in position by a member attached to the bottom of said shaft.

4. A well-drilling tool provided with inclined centrally positioned rollers of varying sizes, the different sizes forming a taper so as to gradually enlarge or expand the object with which they come in contact.

5. A well-drilling tool provided with a series of inclined rollers slidingly positioned upon a shaft, said rollers being in contact with an exterior object simultaneously on diametrically opposite sides of said roller.

6. A well-drilling tool provided with a series of inclined rollers, that contact simultaneously on diametrically opposite sides, and give clearance on the sides normal thereto.

7. A device of the character described, comprising a shaft having a threaded connecting joint at the top and bottom thereof, and having a water channel passing therethrough, a detachable bearing surrounding said shaft, and a roller inclined to the axis of said shaft rotatably secured upon said bearing.

8. A device of the character described, comprising a shaft with a threaded connecting joint at the top and bottom thereof, and having a water channel passing therethrough, a detachable inclined bearing secured centrally upon said shaft, and an inclined roller rotatably secured upon said bearing.

9. A device of the character described, comprising a central supporting member threaded at both ends, with a water channel passing therethrough, an inclined detachable bearing centrally and non-rotatably secured upon said member, and a roller rotatably secured upon said bearing, said roller being inclined and approximately centrally mounted about the axis of said supporting member.

10. A tool of the character described, said tool being provided with a central shaft, and a bearing surrounding said shaft, said bearing carrying a roller rotatably mounted thereon, said bearing imparting a vertical oscillating movement to said roller.

11. A tool of the character described, said tool being provided with a central shaft, a bearing and a roller surrounding said shaft, said bearing being for the purpose of imparting a vertical oscillating movement to said roller.

12. A tool of the character described, said tool being provided with a central shaft having a tool joint thereon, and having a bearing with its outer bearing face inclined to the axis of said shaft, and a roller mounted thereon, said bearing and said roller surrounding the axis of said shaft.

ROWLAND O. PICKIN.